Sept. 21, 1965  B. STUHL  3,207,183
CAM OPERATED MIXING VALVE
Filed April 2, 1963
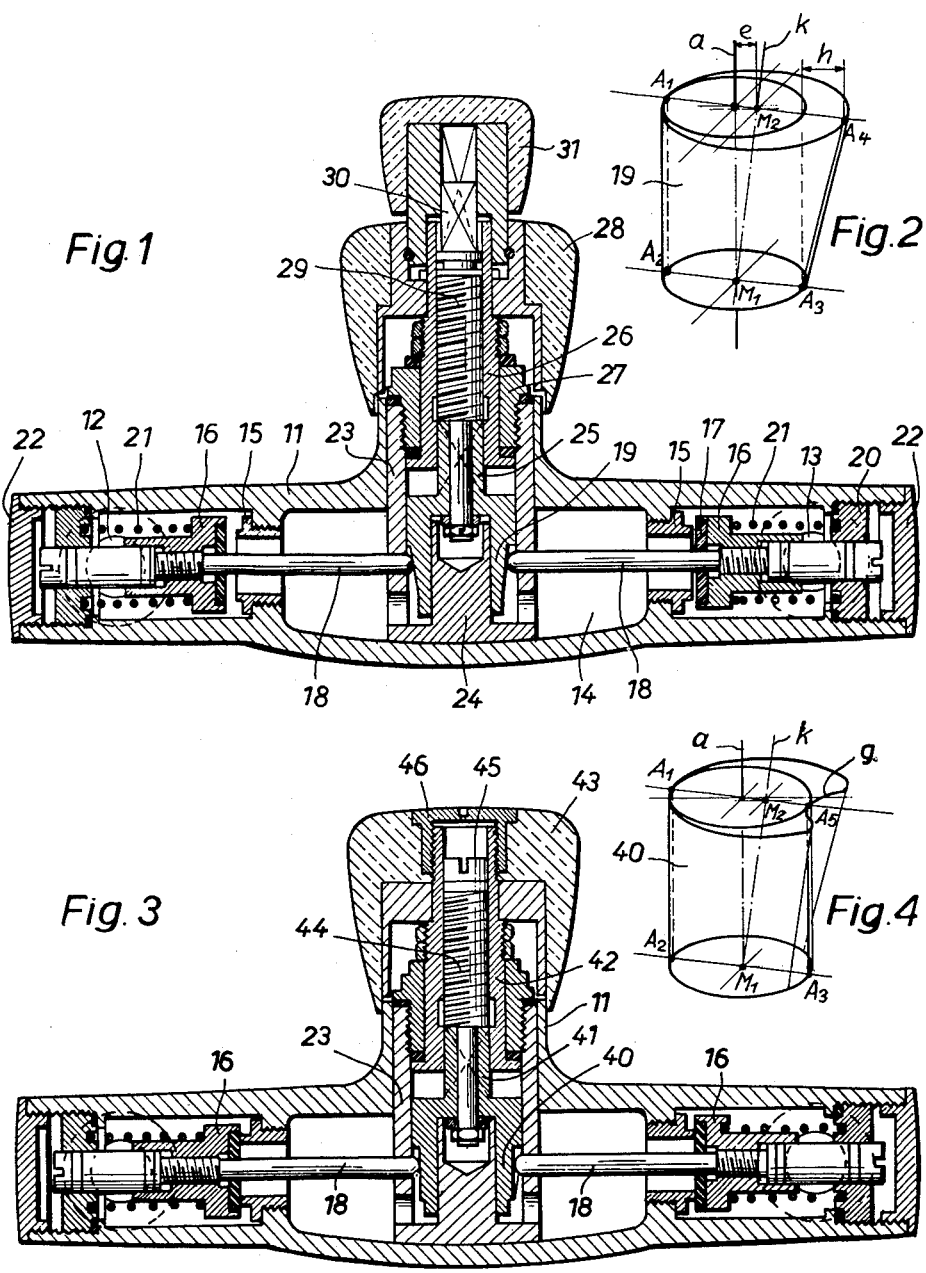

United States Patent Office 3,207,183
Patented Sept. 21, 1965

3,207,183
CAM OPERATED MIXING VALVE
Bruno Stuhl, Buchs, Aargau, Switzerland, assignor to Aktiengesellschaft Karrer, Weber & Cie. Armaturenfabrik und Metallgiesserei, Aargau, Switzerland
Filed Apr. 2, 1963, Ser. No. 269,969
4 Claims. (Cl. 137—635)

The present invention relates to mechanically controlled mixing valves of the type having a cold water and a hot water supply connection, a mixing chamber, and a valve arranged between each supply connection and the mixing chamber, the closure member of each valve being subjected to spring pressure acting in closing direction on the closure member, which two valves are situated opposite each other along a common axis, and the closure members of the valves being movable in opposite directions.

In mixing valves of this type closure and control members are arranged, which perform their functions such as opening and closing the water supply and mixing hot and cold water independently of each other. This results in that the control members which are adjusted to a predetermined mixing ratio, retain their position when the rate of discharge changes. However, since the flow resistance in each valve depends on the stroke of the valve, the delivery of the valves will not be changed proportionally with a change of the rate of discharge by varying the position of the closure members, so that upon a change in the rate of discharge the mixing ratio is also changed though no displacement of the valves is effected. On the other hand, when with a given rate of discharge the valves are readjusted in order to change the mixing ratio, the rate of discharge also changes though no change in the particular position of the closure member controlling the rate of discharge has been effected.

It is an object of this invention to provide a mechanical mixing valve which avoids this drawback and which is able to make allowance for the flow resistance in each valve over the entire range of tapped amounts for all mixing proportions between only—cold water and only—hot water delivery.

According to the invention, the mixing valve of the type described comprises an adjustable control member against which the valve members bear by the intermediary of feeler rods, the control member being mounted on an adjusting spindle having its axis extending at right angles to said common axis of the valve members, while axial displacement of the control member changes the sum of the strokes of the two valve members and the rotation of the control member changes the ratio of the strokes of the two valve members.

Since the rate of discharge is to remain constant when the control member is turned, the sum of the cold water—and hot water proportions must be constant. The sections through the control member extending at right angles to the axis of adjustment of the control members, which result from this condition, represent closed curves which deviate only slightly from eccentric circles. The circumferential lines along which the feeler rods slide during a shifting of the control member may be curves which precisely correspond to the curves of the flow characteristic of the two valve members. However, when the maximum rate of discharge is relatively small, as this is mostly the case in mixing valves for lavatory basins, showers or the like, provided in household installations, an approximately linear ratio between the amount of water delivered and the stroke of the valve member can be assumed so that the said normal sections of the control member can be formed as eccentric circles and the circumferential lines made linear, without any noticeable deviation from the required constancy of the tapped amount, when the mixing temperature is varied, or of the mixing temperature, when the tapped amount is varied.

An additional advantage of the invention consists in that the mixing valve can be constructed for a predetermined adjustment of the delivery to a constant rate, permitting an on-and-off control and an adjustable mixing temperature, requiring only a single operating knob. Such mixing valves may be advantageously used in installations having many tapping places, e.g. in hotels, since they allow a more economical consumption of water than mixing valves having an adjustable rate of discharge.

The present invention will now be described in more detail with reference to the accompanying drawings illustrating, by way of example, two embodiments of a mixing valve according to the invention, and in which:

FIGURE 1 is a longitudinal section through a mixing valve having two operating knobs for varying the rate of discharge, FIGURE 2 is a diagrammatic perspective view of a control member of the valve, drawn to a larger scale, FIGURE 3 is a longitudinal section through a mixing valve having a single operating knob for on-and-off control of the fixed rate of discharge, FIGURE 4 shows the control member of this valve in diagrammatic perspective view, drawn to a larger scale.

Both examples of construction have the same housing and a similar arrangement of the valve members. They mainly differ in the shape of the control member.

In FIG. 1, a longitudinal housing 11 has two rearwardly directed branch connections 12 and 13 for supplying cold water and hot water. These connections are provided at opposite end portions of the housing 11. In its central portion the housing is enlarged to form a mixing chamber 14, which is connected to a discharge spout not shown in the drawing. A valve member is arranged between each supply connections 12, 13 and the mixing chamber 14. Both valve members are similarly constructed and consist of a valve seat 15 and a valve plunger 16 with a gasket 17. The valve plunger 16 is screwed to a feeler rod 18 one end of which abuts against a control member 19, while the other end is mounted in a guide disk 20. The valve seat 15 and the guide disk 20 are screwed into the housing in a fixed position. A coil spring 21 is inserted between the guide disk 20 and the valve plunger 16 and forces the valve plunger against the valve seat. The valve chambers at the opposite ends of the housing are closed by covers 22. The feeler rods 18 of both valves, are situated along the same longitudinal axis, called valve axis.

A guide cylinder 23 having a vertical axis which intersects the valve axis, is inserted into the mixing chamber 14 and provided with a peg 24 for guiding the control member 19 which is rotatable and vertically movable. For this purpose, the conical control member 19 has cylindrical top and bottom portions and at the top it is provided with an extension 25 of square section, which is slidably engaged within a hollow threaded spindle 26. This hollow spindle is rotatably guided by a closure member 27 in sealed engagement with the spindle 26, the member 27 being screwed into the top of the guide cylinder 23. The hollow spindle 26 is fixed for rotation with a rotary knob 28. A screw 29 within the hollow spindle 26 is axially extended through the square section 25 of the member 19 so as to be rotatable with respect to the member 19, but axially fixed relatively thereto.

In the embodiment according to FIGURE 1 the screw 29 is provided on its top with a square section 30 which slidably engages into a second rotary knob 31. This knob 31 is mounted in the top of the rotary knob 28 so as to be secured against longitudinal displacement with respect to the knob 28. When the knob 28 is rotated, the control body 19 is concurrently turned. When the knob 31 is rotated, the control body will move in vertical direction.

FIGURE 2 represents a separate and perspective view of the control member 19. Its shape is that of a frustum of an oblique inverted circular cone, whereby the circular sectional planes extend at right angles to the axis $a$ of the vertical movement of the member 19. The minimum base circle has the centre M1 and the diameter A2, A3. The maximum base circle has the centre M2 and the diameter A1, A4. The cone axis $k$ extends through the centres M1, M2 of the two circles. This axis intersects the motional axis $a$ in the centre M1. The two axes $a$ and $k$ define a plane which intersects the cone surface in the circumferential lines A1, A2, and A3, A4. This plane is a plane of symmetry. The difference of minimum and maximum diameter is $h$ and the eccentricity $e$ of the maximum circle is $h$. It results that $h$ represents the maximum stroke of one of the valve members 16, preferably of the cold water valve, when the other valve, preferably the hot water valve, is closed. The circumferential line A1, A2 in this case extends parallel to the axis $a$ of vertical movement.

When the plane of symmetry is situated in the common axis of the two valves and the control member 19 is completely raised, the two feeler rods 18 are situated on the points A2, A3 of the minimum circle and both valves are closed. From this position, either by rotating the knob 31 and thus by lowering the control member, the cold water valve can be opened to the desired rate of discharge, and the water temperature can be changed from cold to the desired mixing temperature by turning the knob 28, or the mixing temperature may in advance be adjusted with reference to a scale on the housing 11 by turning the knob 28, and the valves may be opened to the desired rate of discharge by rotating the knob 31 while the predetermined stroke ratio of the two feeler rods is maintained.

The mixing valve as illustrated in a longitudinal section in FIGURE 3, differs from that shown in FIGURE 1 solely with respect to the shape of the control member 40 and by the adjusting knob 43 and adjusting screw 44.

The control member 40 is again guided within a guide cylinder 23 and its extension 41 of square section engages a hollow threaded spindle 42 which is rotatable by means of a knob 43, and may also be vertically moved by means of a screw 44, which is mounted within the hollow spindle 42. The screw 44, however, terminates with a slotted head 45 within the hollow spindle 42 and can be turned by a screw driver. The hollow spindle 42 is closed on its top by a screw nut 46 which simultaneously retains the knob 43 on the spindle 42.

With the screw nut 46 removed, the mixing valve can be adjusted to a fixed position to a predetermined rate of discharge by turning the screw spindle 44 and raising or lowering the control member 40. The control member 40 which concurrently turns when the knob 43 is turned, actuates the feeler rods 18 in a first small angular movement to position the valves 16 to the predetermined rate of discharge and causes in the remaining greater angular movement the gradual change of the mixing ratio from only—cold water to only—hot water discharge condition.

The control body 40 is diagrammatically shown in FIGURE 4. Its general shape is also that of a frustum of inclined circular cone. However, at the maximum circle, at the place of the maximum stroke $h$, in FIGURE 2, a vertical groove $g$ is provided whose bottom line extends along the circumferential line A3–A5, so that the groove gradually becomes shallower and runs out or disappears at the point A3 of the minimum circle. In the plane of symmetry defined by the axis $a$ and $k$ the circumferential line A1–A2 is opposite the circumferential line A3–A5, these two lines, when contacted by the feeler rods 18, defining the position of closure of the valves 16. Accordingly, both valves are closed, when the control member 40 is turned so that the plane of symmetry is situated in the common axis of the two valves. In turning the control member 19, first one of the valves, preferably the cold water valve will be opened to the predetermined rate of discharge by the corresponding feeler rod 18 which travels from the closure line A3, A5 at the bottom of the groove $g$ to the cone surface, while the opposite feeler rod 18 abutting against the closure line A1–A2 will barely be moved. When continuing rotation of the control member 19, the cold water valve 16 will gradually close and the hot water valve 16 will gradually open, the predetermined rate of discharge remaining constant.

In this mixing valve according to FIGURE 3, the angle of rotation of the control member 40 and of the knob 43 is smaller than 180° by the angle required to move the abutting end of the rod 18 out of the groove $g$, the movement of the knob being limited by cooperating stops not indicated in the drawing and provided on the knob 43 and the valve housing 11.

I claim:
1. A mechanically controlled mixing valve comprising:
   a valve housing having cold water and hot water supply connections;
   a mixing chamber within said housing;
   a flow controlling valve member between the cold water supply connection and said mixing chamber;
   a flow controlling valve member between the hot water supply connection and the mixing chamber;
   said flow valve members being disposed opposite each other in axial alignment along a common axis;
   a rotatably and axially adjustable valve control member within said housing, said valve control member being a frustum of an oblique circular cone, the circular top and bottom planes of which intersect the axis of axial adjustment of said valve control member, the minimum circle of said valve control member having a diameter which affects the closing of both flow controlling valve members and having its center situated in said axis, the maximum circle having a diameter which affects the opening of both flow controlling valve members to the maximum rate of discharge and having its center situated eccentricly with respect to said axis, said valve control member being additionally provided with an axially extending groove which is deepest at the maximum circle, and becomes shallower towards the minimum circle, the deepest points along an axially extending line of said groove being situated in a plane of symmetry defined by the cone axis and the axis of the axial movement of the valve control member, said axially extending line being parallel to the axis of axial movement of said valve control member;
   an axially extending feeler rod operatively secured to each flow valve member, the free end of each feeler rod coacting with a surface of said valve control member;
   means for axially displacing said valve control member;
   and means for rotating said valve control member;
   said valve control member being initially located within said mixing chamber so that both flow valve members are closed when said plane of symmetry coincides with said common axis of the two valve members, upon rotation of said valve control member by a predetermined angle, one of the flow valve members is opened to a predetermined rate of discharge and upon further rotation thereof said one of said flow control valves is gradually closed while the other of said flow valves is gradually opened, the total rate of discharge of the mixing valve remaining constant at said predetermined rate of discharge.

2. The apparatus of claim 1 wherein said valve control member is free to rotate through an angle of 180° less the amount of said predetermined angle.

3. The mixing valve of claim 1 wherein the means for axially displacing said valve control member includes means for presetting the axial displacement of said valve control member.

4. The mixing valve of claim 3 wherein the means for presetting the axial displacement of said valve control member comprises:
   a hollow spindle extending at right angles to said common axis of the flow controlling valves, said valve control member slidably engaging a lower portion of the interior of said spindle;
   and a screw threadably engaging the upper interior of said hollow spindle and fixedly secured to said valve control member; rotation of said screw causing axial displacement of said valve control member within the interior of said spindle.

References Cited by the Examiner

UNITED STATES PATENTS

| | | | |
|---|---|---|---|
| 951,161 | 3/10 | Watrous | 137—636.1 |
| 1,326,247 | 12/19 | Zengel | 137—636.1 X |
| 1,742,307 | 1/30 | Eble | 251—257 |
| 2,679,865 | 6/54 | Griffith | 137—636.1 |

FOREIGN PATENTS

| | | |
|---|---|---|
| 243,603 | 2/63 | Australia. |
| 594,489 | 6/59 | Italy. |

ISADOR WEIL, *Primary Examiner.*

WILLIAM F. O'DEA, *Examiner.*